Figure 1:
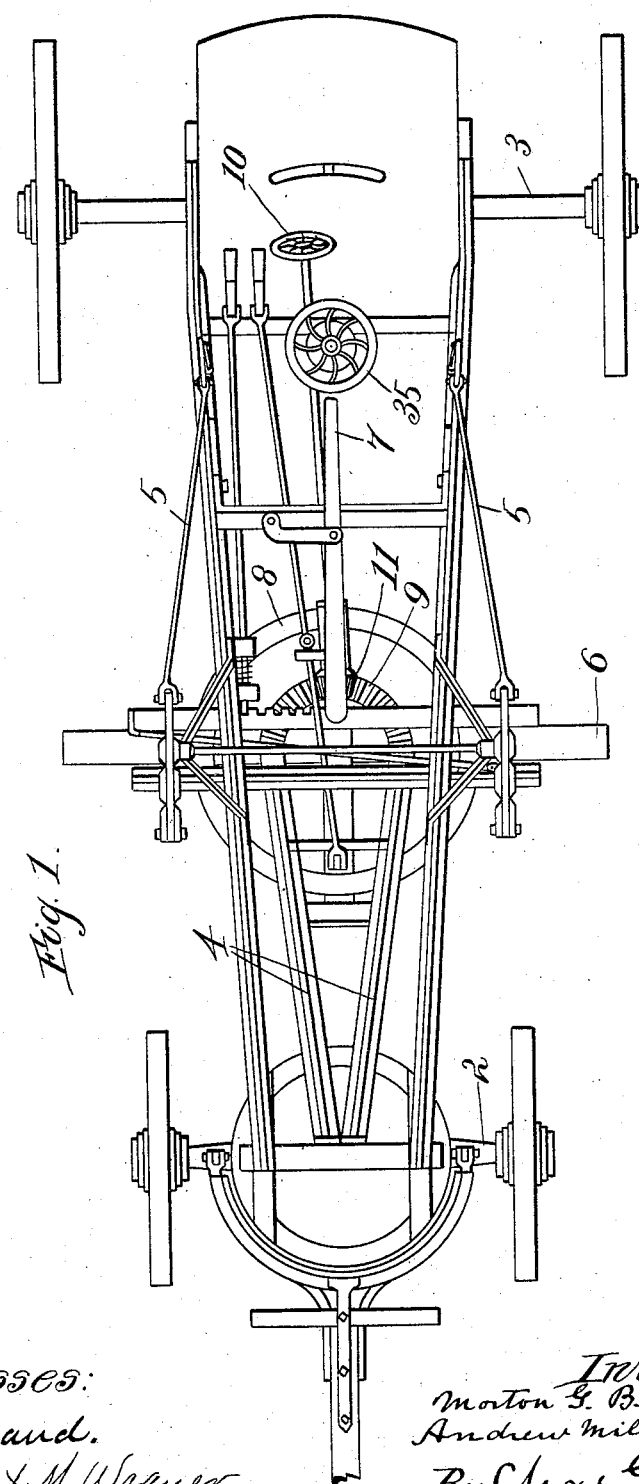

(No Model.) 4 Sheets—Sheet 1.

M. G. BUNNELL & A. M. BELFIELD.
MACHINE FOR MAKING AND REPAIRING ROADS.

No. 567,292. Patented Sept. 8, 1896.

Witnesses:
A. F. Durand.
Margaret M. Wagner.

Inventors:
Morton G. Bunnell
Andrew Miller Belfield.
By Chas. G. Page Atty (No Model.) 4 Sheets—Sheet 2.

M. G. BUNNELL & A. M. BELFIELD.
MACHINE FOR MAKING AND REPAIRING ROADS.

No. 567,292. Patented Sept. 8, 1896.

Witnesses:
A. F. Durand
Margaret M. Wagner

Inventors:
Morton G. Bunnell
Andrew Miller Belfield
By Chas. G. Page Atty.

(No Model.) 4 Sheets—Sheet 3.
M. G. BUNNELL & A. M. BELFIELD.
MACHINE FOR MAKING AND REPAIRING ROADS.
No. 567,292. Patented Sept. 8, 1896.
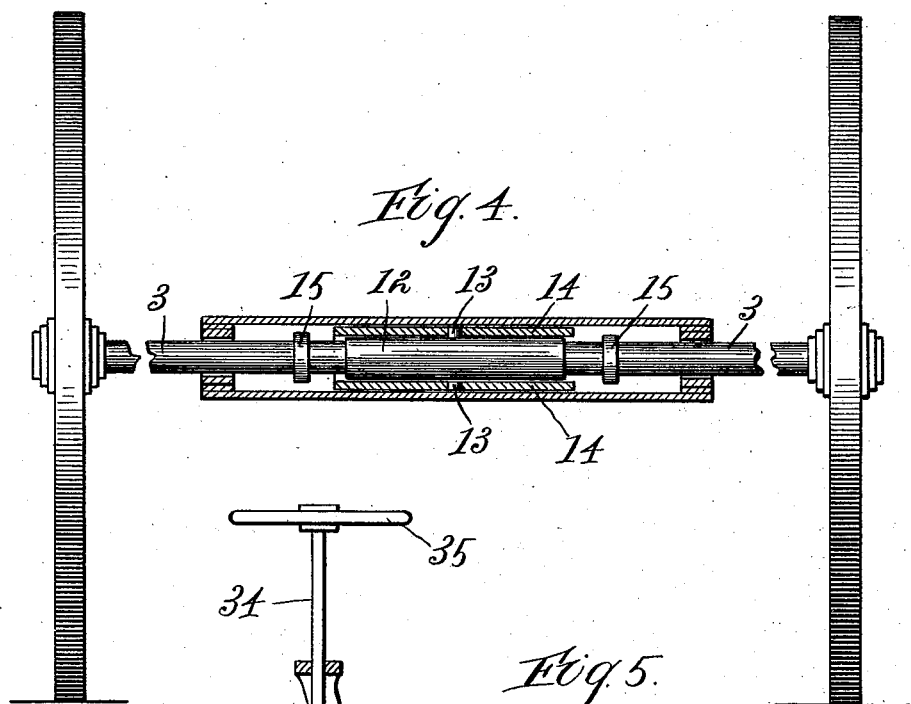
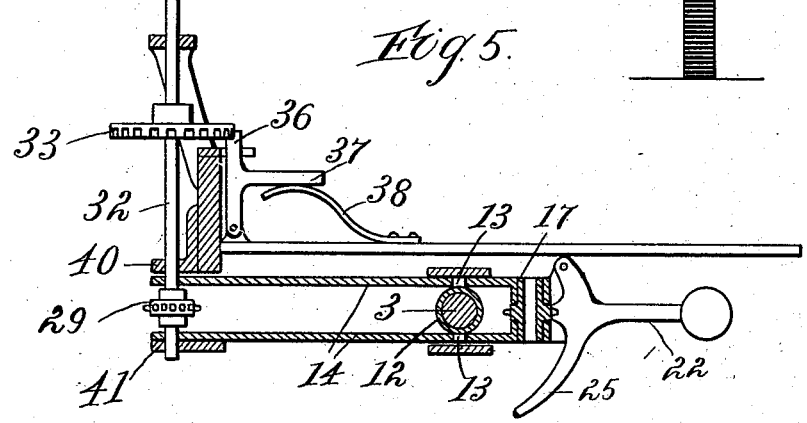
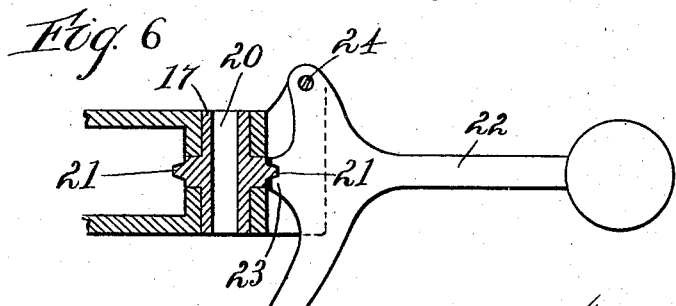
Witnesses:
A. F. Durand.
Margaret M. Wagner
Inventors:
Morton G. Bunnell.
Andrew Miller Belfield.
By Chas. G. Page Atty.

(No Model.) 4 Sheets—Sheet 4.

M. G. BUNNELL & A. M. BELFIELD.
MACHINE FOR MAKING AND REPAIRING ROADS.

No. 567,292. Patented Sept. 8, 1896.

UNITED STATES PATENT OFFICE.

MORTON G. BUNNELL AND ANDREW MILLER BELFIELD, OF CHICAGO, ILLINOIS, ASSIGNORS TO FREDERICK C. AUSTIN, OF SAME PLACE.

MACHINE FOR MAKING AND REPAIRING ROADS.

SPECIFICATION forming part of Letters Patent No. 567,292, dated September 8, 1896.

Application filed January 13, 1896. Serial No. 575,257. (No model.)

*To all whom it may concern:*

Be it known that we, MORTON G. BUNNELL and ANDREW MILLER BELFIELD, citizens of the United States, residing in the city of Chicago, county of Cook, and State of Illinois, have invented certain new and useful Improvements in Machines for Making and Repairing Roads, of which the following is a specification.

Our invention relates to road-working machines of the kind in which a long diagonally-disposed scraper-blade is arranged between the front and rear wheels of a body-frame or carriage having means for supporting and adjusting said scraper-blade, and having the rear axle arranged for adjustment relatively to the body-frame.

Prominent objects of our invention are to provide for a greater range of adjustment on the part of the rear axle, and to particularly adapt the same for adjustment with reference to a diagonally-reversible scraper-blade; to permit the axle to be swung bodily into an oblique position with reference to the body-frame, and also to permit its horizontal angle to be changed either when thus swung to one side or when in a central position with reference to said body-frame; to arrange simple, quick-acting, and convenient means for swinging the rear axle about a vibratory center and also for swinging said vibratory center about a pivotal point in the body-frame; to provide efficient and reliable means for connecting to the body-frame an axle capable of both vibratory adjustment and lateral swinging adjustment; and to provide certain further novel and improved details, as hereinafter set forth.

In a road-working machine characterized by our invention, the rear axle, which is relatively longer than the front axle, is capable of independent horizontal swinging adjustment and of lateral projection from the body-frame, and may be swung bodily into an oblique position with reference to the same. It is vibratorily connected with a swinging frame, which in turn is pivotally connected with the body-frame. Said rear axle is arranged for vibratory movement about its connection with the swinging frame, and the latter is also arranged for pivotal adjustment with reference to the body-frame independent of the vibratory movement of the axle. By such arrangement either the rear axle or the swinging frame may be adjusted so as to bring either one of the rear wheels into alinement with its companion front wheel. The rear axle may be inclined to the body-frame so as to bring the rear wheels into any desired position with relation to the front wheels or scraper-blade, when the swinging frame may be projected or swung in a direction to cause the body-frame to assume a normally straight direction by reason of its former inclination being replaced by that of said frame. The axle may be horizontally adjusted with reference to the frame, irrespective of the position in which the latter may be, so that a perfect accommodation of the machine to given conditions of work may be had. The swinging frame may be projected toward or away from either side of the machine when the axle is inclined thereto at any angle. Both vibratory adjustment of the axle and swinging adjustment of the swinging frame may be made in the same direction so as to produce an unusual inclination of the axle, to be taken advantage of in turning the machine in a narrow passage-way; and the adjustments may be made in various other ways so as to produce a compound or combination result.

To this end our invention consists in providing the axle with a holder or sleeve which is pivotally connected with the swinging frame so as to permit a horizontal vibratory movement thereof; in pivotally connecting this frame to the body-frame of the machine; in providing means for horizontally swinging the axle about its vibratory connection with the frame, for swinging the latter about its pivotal connection with the body-frame independent of adjustment of the axle, and for normally locking both the axle and swinging frame in adjustment, and in such other features as are hereinafter set forth.

Figure 2:
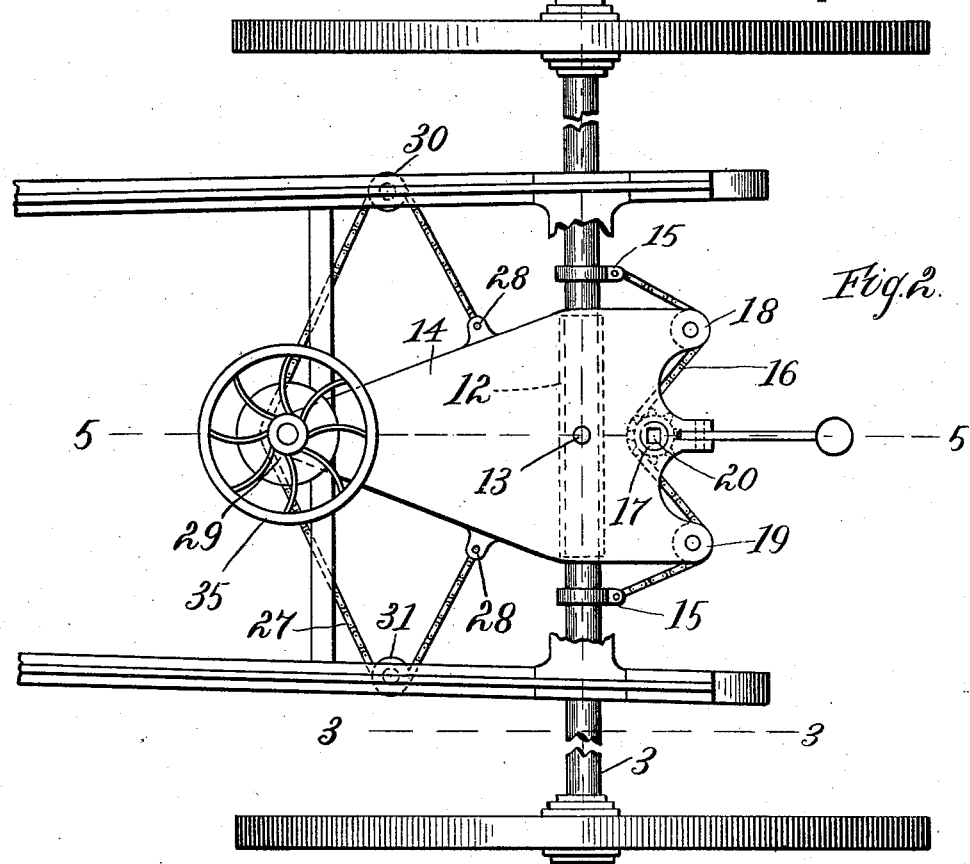
Figure 3:
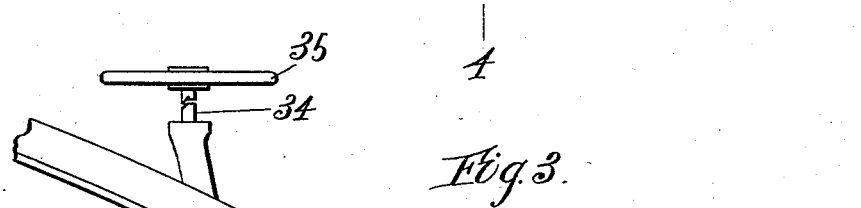
Figure 7:
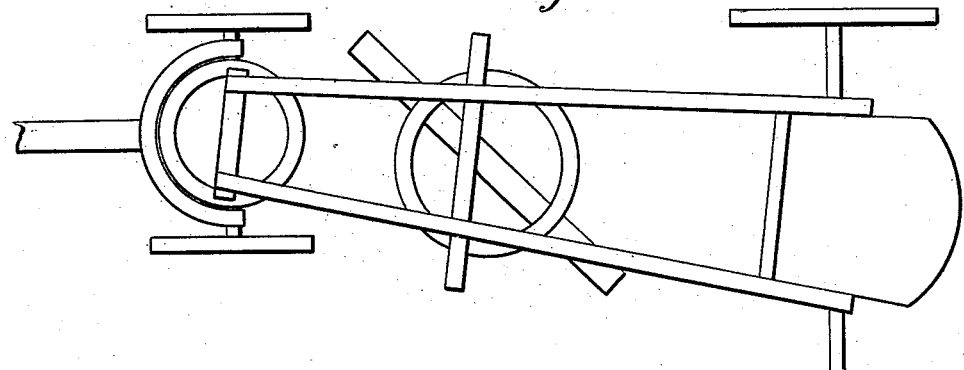
Figure 8:
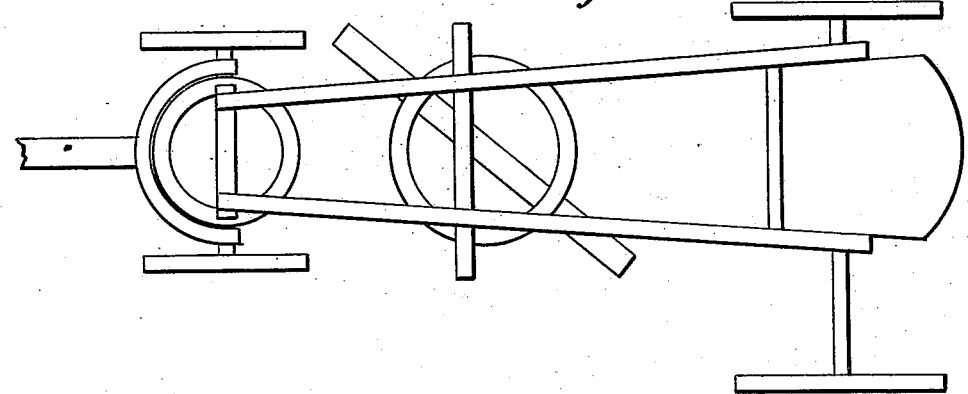
Figure 9:
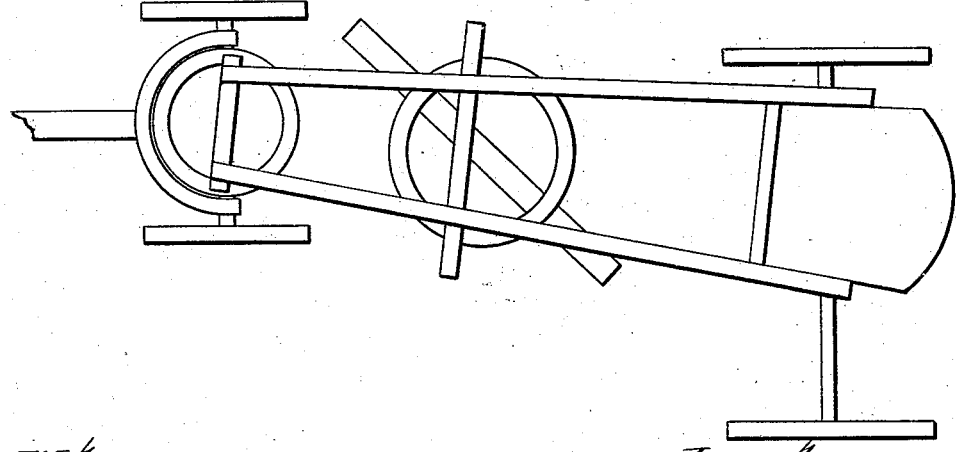

In the accompanying drawings, Figure 1 is a top plan of a road-machine embodying our invention. Fig. 2 is a plan of the rear portion of the same. Fig. 3 is a view on the line 3 3 in Fig. 2. Fig. 4 is a section of the machine on the line 4 4 in Fig. 2. Fig. 5 is a section on the line 5 5 in Fig. 2. Fig. 6 illustrates a device for normally locking the axle in vibratory adjustment. Figs. 7, 8, and 9 are plan views of so much of the machine as is necessary to illustrate the advantages of its construction.

For the purposes of our invention any suitable construction of the body-frame may be employed. The scraper-blade can be connected with the body-frame in any preferred manner so that it will be adjustable horizontally and vertically and arranged to swing about a point between its ends to permit of its being placed diagonally to the line of progression with either end in advance. In the preferred arrangement shown in Fig. 1 the body-frame 1 is supported by the pivoted short front axle 2 and the long rear axle 3. The scraper-blade 6 is arranged to extend across the width of the machine, and is suspended below the body-frame by suitable raising and lowering devices, operated by levers 5. The raising and lowering mechanism is so arranged that the blade may be swung bodily from side to side of the machine, and for the purpose of thus swinging the blade it is drawn by the horizontally-swinging draft-bar 4, which is pivotally secured at the forward end of the machine and swung by the lever 7.

The blade may be connected in any suitable way for diagonal adjustment, although as a preferred arrangement it is attached to the circle or turn-table 8, having at its center a pivotal connection with the horizontally-swinging draft-bar and provided with the segment-gear 9. The rotation of the hand-wheel shaft 10 turns the segment-gear 9 by means of the pinion 11 so as to bring the scraper-blade to any required adjustment.

In order to resist the side draft resulting from the resistance offered by the soil to the scraper-blade, it is desirable to swing the rear axle with reference to the horizontal angle of the blade relatively to the line of progression.

With such an arrangement as we propose either end of the axle may be swung forward about its vibratory connection, sometimes one and sometimes the other, according to the nature of the work to be performed, and while the swinging frame may also be adjusted to accomplish this result, we find it desirable to swing the axle as aforesaid, in order to bring the wheels at one side of the machine into alinement, and then to project the swinging-frame toward one or the other side of the machine after it has been set oblique to the line of progression. As a simple and efficient means of accomplishing this, we provide the rear axle 3 with a sleeve or holder 12, constructed rigid therewith, and pivotally connect this holder with the swinging frame 14 by the pivots or studs 13, in place of pivotally connecting the axle directly with said frame. As a convenient means of swinging the axle about its vibratory connection, the sprocket-chain 16 is secured to the collars 15, with which the axle is provided, and passed about the wheels 17, 18, and 19. Wheel 17 is a sprocket-wheel having teeth 21, and is arranged to be rotated by a rod engaging with the socket 20, with which it is provided. Wheels 18 and 19 are so placed as so render the draft of the chain more nearly at right angles to the length of the axle. In order to normally lock the axle in its vibratory adjustment, we provide a weighted lever 22 having a blade 23, which engages with the teeth of the sprocket-wheel 17. Said lever, however, is pivoted at 24 and has an arm 25, which extends into the axial line of the sprocket-wheel 17. Hence a rod or bar entering the socket 20 to turn the wheel encounters the arm 25, moves it to one side, and thereby disengages the blade 23 from the sprocket-wheel and leaves the same free to be turned.

The swinging frame 14 may be pivoted to the body-frame in any suitable manner and provided with any one of the known mechanisms for swinging it to one side or the other of the machine.

As a preferred arrangement, the sprocket-chain 27 is secured to it at points 28 sufficiently distant from the pivotal point to give ample leverage and passed about the wheels 29, 30, and 31. The sprocket-wheel 29 is used as a means for moving the chain to procure the desired adjustment, and the wheels 30 and 31 are so placed as to permit the draft of the chain to be in the most advantageous direction. The rod 32, for turning wheel 29, passes through the swinging frame 14 and body-frame pieces 40 and 41, thereby serving as a pivotal connection for the former.

For normally locking the swinging frame in adjustment we select the mechanism illustrated in Fig. 5. Here the rod 32 for the wheel 29 is shown provided with the toothed wheel 33, which is engaged by the trip or catch 36. The latter has an arm 37, against which the spring 38 presses to normally hold the trip in engagement with said toothed wheel.

The hand-wheel 35 for turning the wheel 29 is desirably not constructed rigid therewith, but is provided with a short rod 34, which fits into a socket in the toothed wheel 33. Said hand-wheel with its companion rod 34 may then be withdrawn from the socket in said toothed wheel and employed to turn the sprocket-wheel 17 for adjusting the horizontal angle of the rear axle, as hereinbefore described.

In Figs. 7 and 8 it will be seen that the companion wheels on either side of the machine may be brought into alinement by inclining the rear axle so as to cause the rear wheels to run to one side, as in Fig. 7; that the swinging frame may then be adjusted so as to bring the body-frame of the machine into a position substantially parallel with the line of progression, while still retaining the wheels in alinement, as in Fig. 8.

In Fig. 9 is illustrated the manner in which our machine may be accommodated to selected relations with furrows or the like, or to work in which it is desired to have the scraper-blade deposit soil in particular localities by utilizing both the vibratory adjustment of the axle and the pivoted adjustment of the swinging frame, to which said axle is vibratorily connected.

What we claim as our invention is—

1. In a road-working machine constructed with a wheeled body-frame and a diagonally-disposed scraper-blade; arranged between the front and rear wheels; the rear axle having a vibratory connection with a swinging frame which in turn has a pivotal connection with the body-frame, whereby the axle can be both projected laterally from the body-frame and swung bodily into an oblique position by moving the swinging frame, and also whereby the axle can be moved independently of the said swinging frame so as to change or modify its horizontal angle, substantially as described.

2. In a road-working machine constructed with a wheeled body-frame and a diagonally-disposed scraper-blade arranged between the front and rear wheels; a swinging frame pivotally connected with the body-frame of said machine and arranged for holding the rear axle; means for swinging the same from side to side of the machine; the rear axle provided with a sleeve or holder having a vibratory connection with said swinging frame; means for horizontally adjusting the axle about its vibratory connection with the swinging frame; and means for normally locking the swinging frame and axle in independent adjustment, substantially as described.

3. In a road-working machine constructed with a wheeled body-frame and a diagonally-disposed scraper-blade arranged between the front and rear wheels; a swinging frame pivotally connected with the body-frame of said machine and arranged for holding the rear axle; a sprocket wheel and chain for swinging the same from side to side of the machine with means for normally locking the same in adjustment; the rear axle provided with a sleeve or holder having a vibratory connection with said swinging frame; a sprocket wheel and chain for horizontally adjusting the axle about its vibratory connection with the swinging frame; and a weighted lever for normally locking the axle in vibratory adjustment; substantially as described.

MORTON G. BUNNELL.
ANDREW MILLER BELFIELD.

Witnesses for Bunnell:
   MARGARET M. WAGNER,
   ARTHUR F. DURAND.
Witnesses for Belfield:
   WILLIAM S. ADAMS,
   L. M. STONE.